United States Patent
Chang et al.

(10) Patent No.: US 9,377,879 B2
(45) Date of Patent: Jun. 28, 2016

(54) TOUCH PEN AND MOBILE TERMINAL HAVING THE SAME

(71) Applicant: Samsung Electronics Co., Ltd., Gyeonggi-do (KR)

(72) Inventors: Hyunseok Chang, Seoul (KR); Hongmoon Chun, Gyeonggi-do (KR); Hwanseok Choi, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 182 days.

(21) Appl. No.: 13/969,792

(22) Filed: Aug. 19, 2013

(65) Prior Publication Data
US 2014/0062969 A1    Mar. 6, 2014

(30) Foreign Application Priority Data
Aug. 28, 2012   (KR) .................. 10-2012-0094148

(51) Int. Cl.
*G06F 3/0354* (2013.01)
*G06F 1/16* (2006.01)
(52) U.S. Cl.
CPC .......... *G06F 3/03545* (2013.01); *G06F 1/1656* (2013.01); *G06F 2200/1632* (2013.01)
(58) Field of Classification Search
None
See application file for complete search history.

(56) References Cited

U.S. PATENT DOCUMENTS

| | | | |
|---|---|---|---|
| 4,171,168 A * | 10/1979 | Braun ........................... 401/35 |
| 2001/0015018 A1 * | 8/2001 | Niedermann ......... B82Y 35/00 33/559 |
| 2005/0169504 A1 | 8/2005 | Black |
| 2006/0197754 A1 * | 9/2006 | Keely ................. G06F 3/03545 345/179 |
| 2010/0084202 A1 * | 4/2010 | Selin .................. G06F 3/03545 178/19.01 |
| 2011/0090181 A1 | 4/2011 | Maridakis |
| 2011/0291998 A1 * | 12/2011 | Adams ................ G06F 3/03545 345/179 |
| 2011/0310066 A1 * | 12/2011 | Fermgard et al. ............. 345/179 |
| 2013/0038579 A1 * | 2/2013 | Boyd et al. ..................... 345/179 |

FOREIGN PATENT DOCUMENTS

| | | |
|---|---|---|
| KR | 10-2003-0047393 A | 6/2003 |
| KR | 10-2004-0013642 A | 2/2004 |
| WO | 2010/037569 A1 | 4/2010 |

* cited by examiner

*Primary Examiner* — Joseph Haley
*Assistant Examiner* — Emily Frank
(74) *Attorney, Agent, or Firm* — Cha & Reiter, LLC.

(57) ABSTRACT

A touch pen is configured for use with a mobile terminal. The touch pen includes a pen point having one end pointedly formed or tapered, and a pen grip extended along a longitudinal axis from one end of the pen point. At least a portion of the pen grip has an asymmetrically shaped outer edge circumference defined with reference to a cross sectional area along the longitudinal axis.

10 Claims, 9 Drawing Sheets

TOUCH PEN AND MOBILE TERMINAL HAVING THE SAME

CLAIM OF PRIORITY

This application claims priority under 35 U.S.C. §119(a) to Korean patent application Serial No. 10-2012-0094148 filed in the Korean Intellectual Property Office on Aug. 28, 2012, the entire contents of which is hereby incorporated by reference.

BACKGROUND

1. Technical Field

The present disclosure relates to a touch pen and a mobile terminal having the same, and more particularly, to a touch pen and a mobile terminal which are configured to prevent an incorrect orientation of the touch pen when inserting the touch pen into the mobile terminal, and which provide an ergonomically enhanced grip when holding the touch pen.

2. Description of the Related Art

In general, a mobile terminal is an electronic device which enables a user to engage in wireless communication with another party. At present, design efforts are under way to decrease the size, thickness, and weight of mobile devices to enhance portability. A recent trend is to provide multimedia features that may perform any of various functions.

Future mobile terminals are expected to be used as multi-function and multi-purpose devices. These terminals will be of decreased size and weight relative to present-day devices, and will be readily configurable for use with various multi-media environments or Internet environments.

Conventional mobile terminals are equipped to perform wireless high-speed data communication in addition to wireless audio communication. A conventional mobile terminal may include a data input and output device, a speaker, a microphone, and an antenna. A mobile terminal such as a smart phone or electronic pad generally uses a touch pad or touch screen as a data input device.

A touch pen configured in the shape of a writing instrument may be employed as an auxiliary device for manipulating a touch pad or touch screen which is housed in a main body of the mobile terminal. A removable touch pen may be provided which is separable from the mobile terminal.

Such a conventional touch pen and a mobile terminal for housing the touch pen are described with reference to FIGS. 1 and 2A to 2C.

FIG. 1 is a cross-sectional view illustrating a mobile terminal having a conventional touch pen, and FIGS. 2A to 2C are front views illustrating a conventional touch pen and a pen point.

Referring to FIGS. 1 and 2A to 2C, a mobile terminal 10 includes a pen receiving groove 11 for inserting and withdrawing a conventional touch pen 13. The touch pen 13 includes a pen point 14 for contacting a touch screen or a touch pad, a pen grip 15 corresponding to a holding area when the user uses the touch pen 13, and a pen clip 16 protruded at an end portion of the pen grip 15.

The touch pen 13 may be withdrawn from, or inserted into, the pen receiving groove 11 provided in the mobile terminal 10.

As the body of the conventional touch pen 13 is generally formed in a cylindrical shape, the outer edge circumference of the pen point 14 may be formed, for example, in a circle, oval, or polygon.

That is, a cross sectional area of the touch pen 13 defined by an outer edge circumference of the touch pen 13 may be formed in one of a plurality of symmetrical shapes including an oval shown in FIG. 2A, a circle shown in FIG. 2B, or a polygon shown in FIG. 2C.

For housing and withdrawal of the touch pen 13, the shape of a cross-sectional area comprising an inner wall circumference of the pen receiving groove 11 is formed in a shape corresponding to the shape of the cross sectional area of the touch pen 13. That is, a section of the pen receiving groove 11 exposed at a surface of the mobile terminal 10 may be formed in one of a plurality of symmetrical shapes including a circle, oval, triangle, or polygon of a symmetric structure, or a portion thereof, so as to permit insertion of the touch pen 3 into the pen receiving groove 11.

The touch pen 13 may be equipped with, for example, one or more side buttons for controlling operation of the touch pen 13 in an intermediate portion thereof. The touch pen 13 may also be equipped with the pen clip 16 in an end portion thereof.

In order to mount elements such as the pen clip 16 or the one or more side buttons in the touch pen 13, a surface of the pen grip 15 may be protruded from the touch pen 13. As additional functions and elements are added to the touch pen 13, a surface of the penholder 15 may protrude from the touch pen 13.

The conventional configuration of the touch pen 13 and the pen receiving groove 11 may exhibit one or more of the following shortcomings.

Due to the fact that an area defined by the outer edge circumference of a periphery of the pen point 14 is formed in a symmetrical shape, when the user inserts the touch pen 13 into the pen receiving groove 11, it is difficult for the user to determine the correct orientation in which to insert the touch pen 13 into the pen receiving groove 11.

Moreover, due to the fact that a first area defined by a section of the inner wall circumference of the pen receiving groove 11, as well as a second area defined by the outer edge circumference of the touch pen 13, both have symmetrical shapes, it is difficult for the user to find the correct orientation for inserting the touch pen 13 into the pen receiving groove 11. That is, in a state in which the user does not know the correct orientation, the user must attempt to insert the touch pen 13 into the pen receiving groove 11 on a trial-and-error basis.

For example, when the user inserts the touch pen 13 into the pen receiving groove 11, even if the pen point 14 is inserted, an erroneous insertion may be achieved in which a protruded portion of an end portion of the touch pen 13 such as the pen clip 16, or an intermediate portion of the touch pen 13, may not be inserted into a groove 12.

When such erroneous insertion occurs, the touch pen 13 must be extracted from the pen receiving groove 11, and another attempt must be made to properly insert the touch pen 13 into the pen receiving groove 11. This process needs to be repeated until the touch pen 13 is properly inserted.

Therefore, conventional configurations of the touch pen 13 and the pen receiving groove 11 of the mobile terminal 10 result in inconvenience to the user. Furthermore, when erroneous insertions of the touch pen 13 are repeated over time, physical wear or damage such as scratching or deformity of the pen receiving groove 11 and the touch pen 13 may occur.

SUMMARY

An aspect of the present disclosure is to provide an improved touch pen configuration for a mobile terminal such that, upon insertion of a touch pen into a pen receiving groove of the mobile terminal, tactile feedback or visual feedback, or both, are provided to a user so as to facilitate a correct orientation of the touch pen into the pen receiving groove. The touch pen configuration prevents erroneous insertion of the touch pen into the pen receiving groove and thereby avoids physical damage, deformity, and scratches to the touch pen and the pen receiving groove. The touch pen configuration also prevents a possible loss or misplacing of the touch pen.

In accordance with another aspect of the present disclosure, a touch pen is configured for use with a mobile terminal. The touch pen comprises a pen point having one end pointedly formed or tapered; and a pen grip extended along a longitudinal axis from one end of the pen point, at least a portion of the pen grip having an asymmetrically shaped outer edge circumference defined with reference to a cross sectional area along the longitudinal axis.

In accordance with another aspect of the present disclosure, a mobile terminal having a touch pen includes: a main body; a pen receiving groove formed in an outer surface of the main body, the pen receiving groove having a cross-sectional area defined by inner wall circumference that is asymmetrically shaped; and a touch pen having a cross-sectional area defined by an outer edge circumference at least a portion of which is asymmetrically shaped, and which mates with the asymmetrically shaped inner wall circumference of the pen receiving groove.

In accordance with another aspect of the present disclosure, a touch pen includes: a pen point that includes a conductive material for inputting a signal into a touch screen by contacting the touch screen, wherein the pen point has one end that is pointedly formed; a pen grip extended in a longitudinal direction by a predetermined length from the pen point so that a user may hold the touch pen, wherein at least a portion of the pen grip is provided with an asymmetric cross-sectional area with reference to the longitudinal direction, such that at least a first surface of the pen grip is protruded or depressed from at least a second surface of the pen grip so as to be distinguished from the second surface; and a gripping portion in which an outer edge surface of a portion of the pen grip is flat formed along the longitudinal direction of the pen grip so as to permit at least one finger of a user to contact the gripping portion in response to the user holding the pen grip.

In accordance with another aspect of the present disclosure, a mobile terminal having a touch pen includes: the touch pen having a pen grip of a predetermined length in a longitudinal direction so as to permit a user to hold the touch pen, at least a portion of the touch pen having a cross-sectional area along the longitudinal direction that is asymmetrically shaped, such that at least a first surface of an outer edge circumference of the pen grip is protruded or depressed from a second surface of the outer edge circumference of the pen grip so as to distinguish the first surface from the second surface; and a pen receiving groove formed in the mobile terminal so as to permit an insertion of the touch pen into the pen receiving groove and so as to permit a subsequent withdrawal of the touch pen from the pen receiving groove, and in which an asymmetrical inner circumference of a cross-sectional area of an inner wall of the groove is formed to mate with an asymmetrical outer circumference of the pen grip such that the outer circumference of the pen grip contacts the inner circumference of the groove when the touch pen is received in the groove.

BRIEF DESCRIPTION OF THE DRAWINGS

The above features and advantages of the present invention will be more apparent from the following detailed description in conjunction with the accompanying drawings, in which.

DETAILED DESCRIPTION

Figure 1:
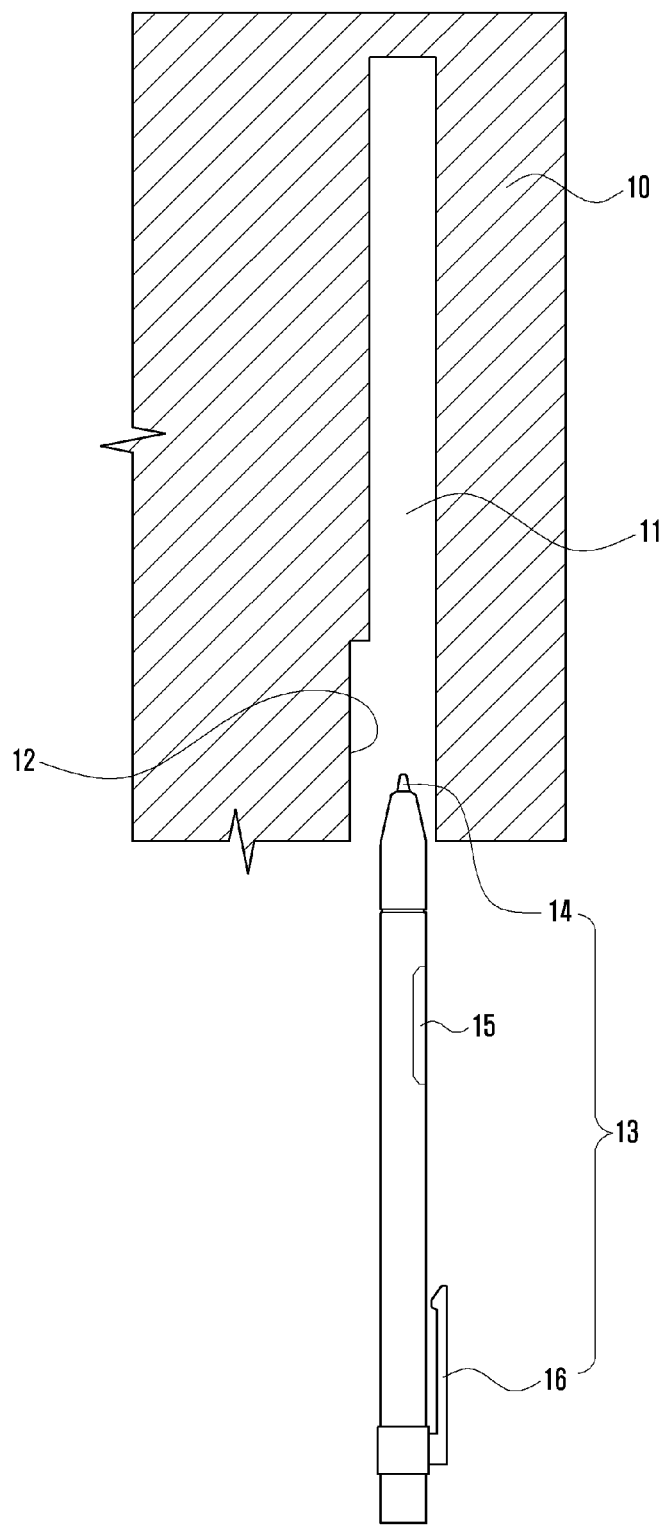
FIG. 1 is a cross-sectional view illustrating a mobile terminal having a conventional touch pen.
Figure 2A:
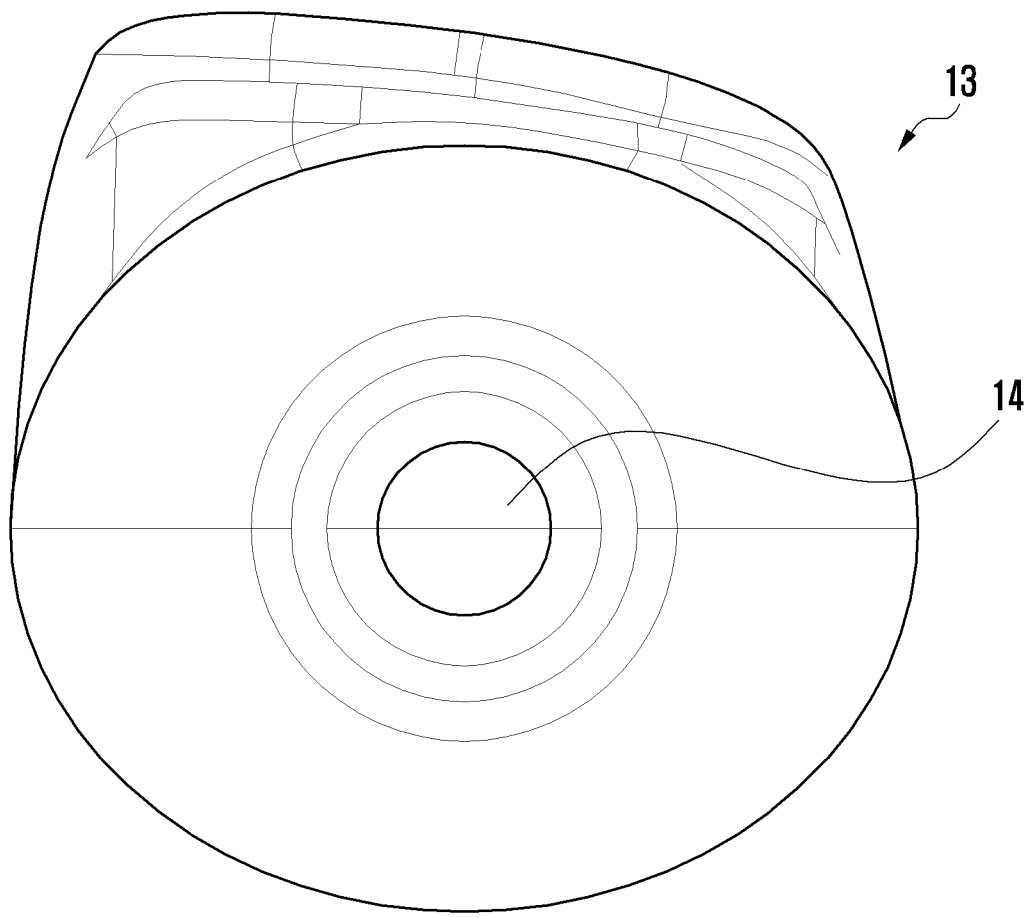
FIG. 2A, FIG. 2B and FIG. 2C are front views illustrating a conventional touch pen and a pen point.
Figure 2B:
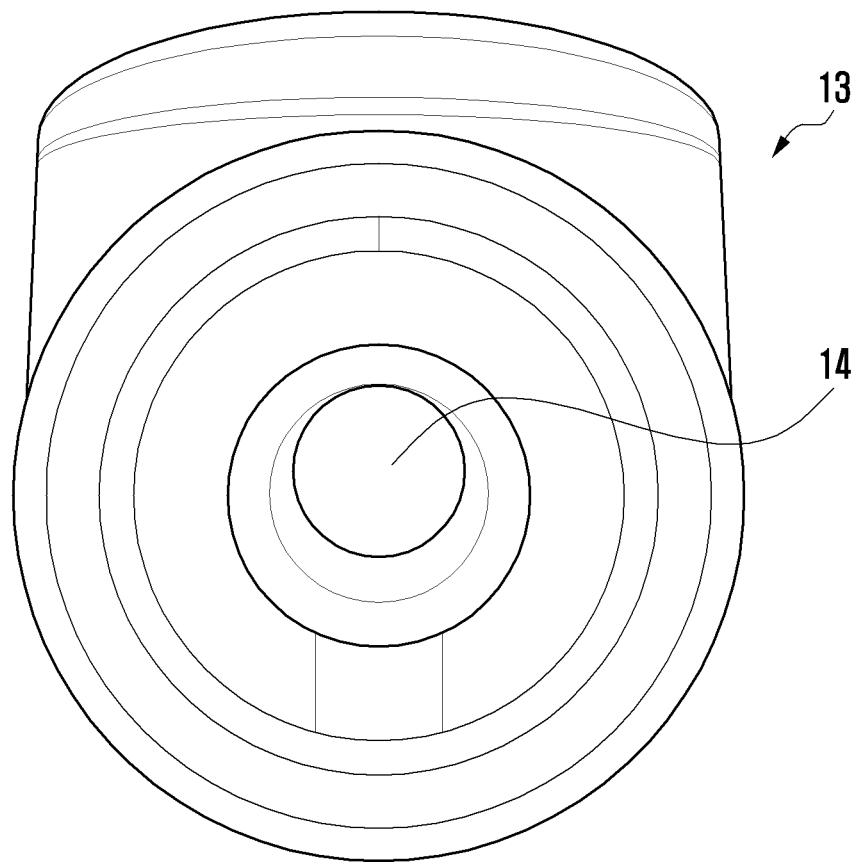
Figure 2C:
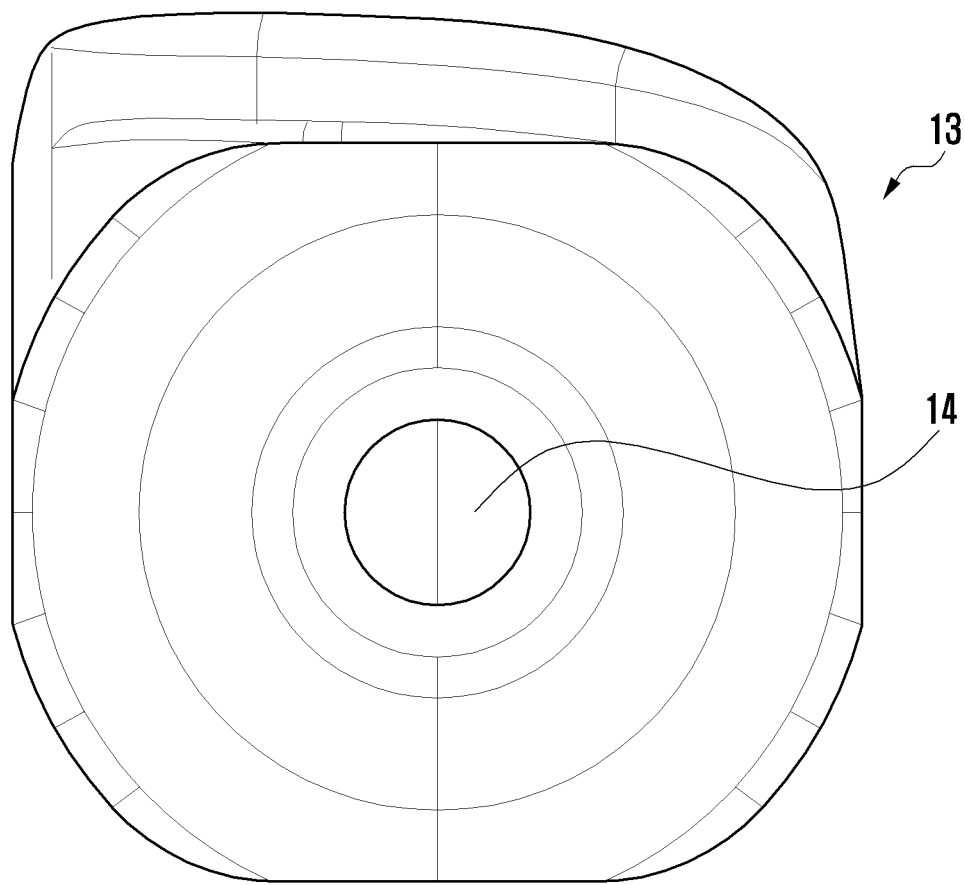

Hereinafter, exemplary embodiments of the present invention are described in detail with reference to the accompanying drawings. The same reference numbers are used throughout the drawings to refer to the same or like parts. The views in the drawings are schematic views only, and are not intended to be to scale or to be correctly proportioned. For the purposes of clarity and simplicity, detailed descriptions of well-known functions and structures incorporated herein may be omitted to avoid obscuring the subject matter of the present invention.

In a touch pen and a mobile terminal having the same according to a set of exemplary embodiments of the present invention, a front portion of the touch pen is formed to have a first asymmetrically shaped cross sectional area, and a pen receiving groove is formed to have a second asymmetrically shaped cross-sectional area that mates with the first asymmetrically shaped cross sectional area. Therefore, as a user can insert an asymmetrically shaped touch pen into a corresponding asymmetrically shaped pen receiving groove, correct insertion of the touch pen is facilitated and erroneous insertion of the touch pen is prevented. By preventing physical damage and deformation of the touch pen and the mobile terminal due to erroneous insertion of the touch pen into the receiving groove, safety and reliability may be improved.

Further, when the user uses a touch pen according to a set of exemplary embodiments of the present invention wherein a pen gripping surface is flatly formed, the pen provides tactile feedback to the user and user convenience is improved.

Pursuant to various exemplary embodiments of the present invention, a mobile terminal may be applied to information and communication devices and multimedia devices such as a tablet personal computer (PC), a mobile communication terminal, a mobile phone, a personal digital assistant (PDA), a smart phone, an international mobile telecommunication 2000 (IMT-2000) terminal, a code division multiple access (CDMA) terminal, a wideband code division multiple access (WCDMA) terminal, a global system for mobile communication (GSM) terminal, a general packet radio service terminal (GPRS), an enhanced data GSM environment (EDGE) terminal, a universal mobile telecommunication service (UMTS) terminal, a digital broadcasting terminal, an automated teller machine (ATM), and applications thereof.

Figure 3:
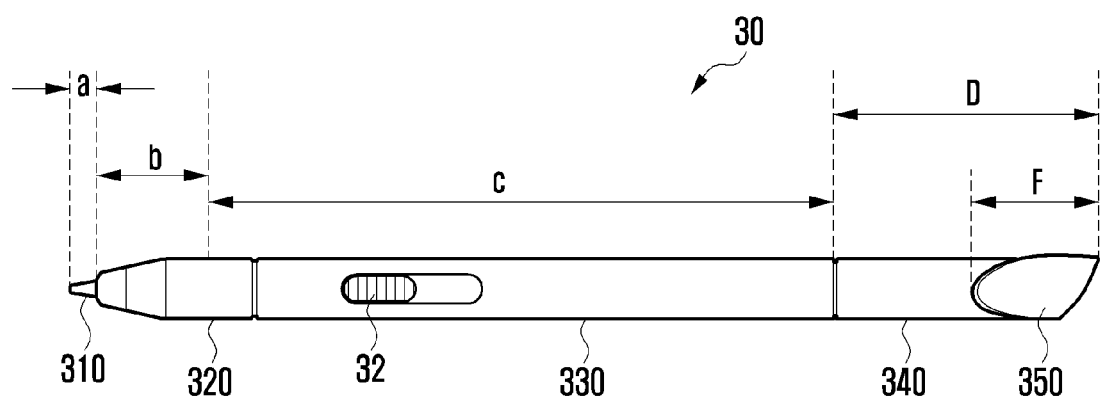
FIG. 3 is a perspective view illustrating a structure of a touch pen according to a set of exemplary embodiments of the present invention.
Figure 4:
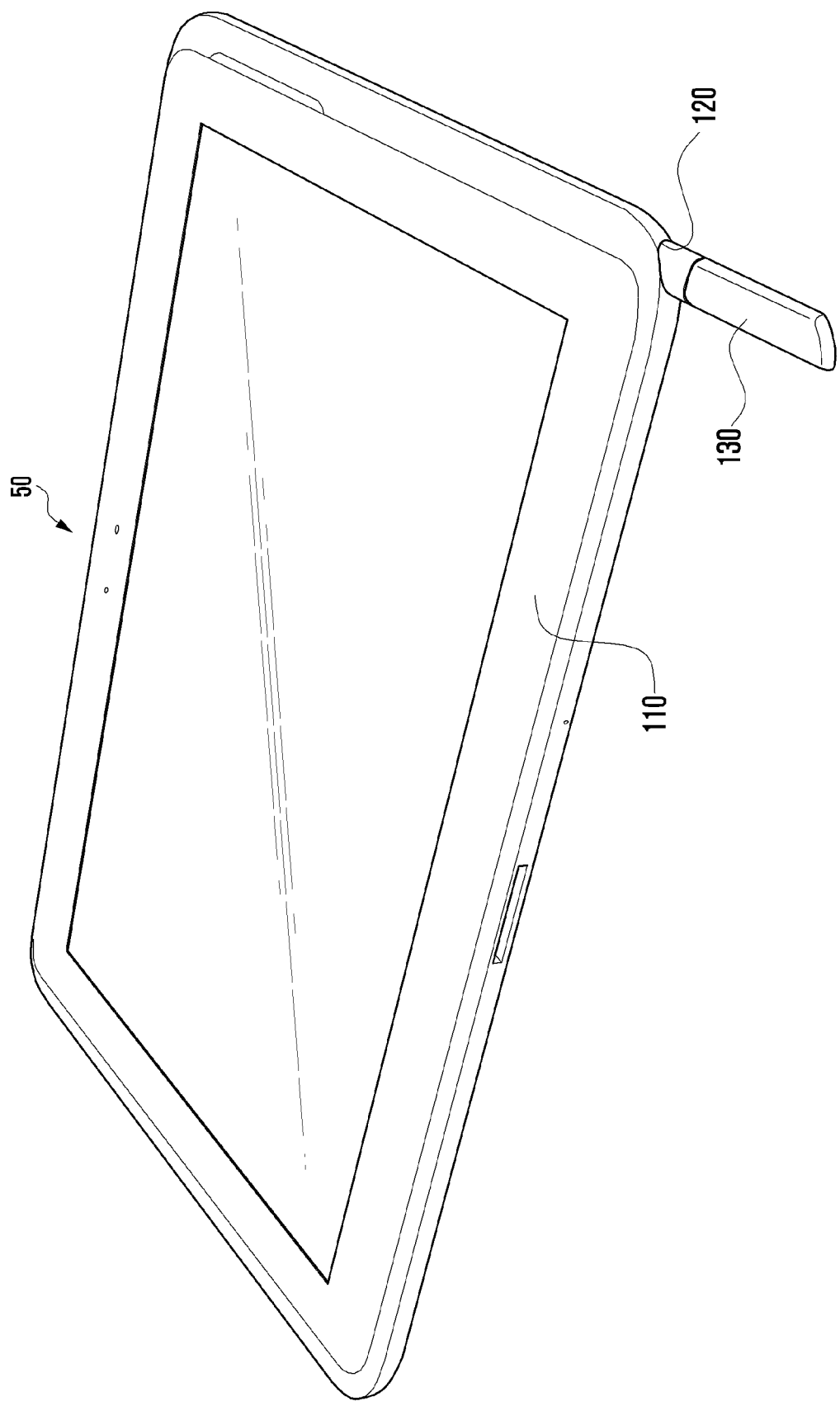
FIG. 4 is a perspective view illustrating an exemplary configuration for a touch pen and a mobile terminal according to a set of exemplary embodiments of the present invention.
Figure 5:
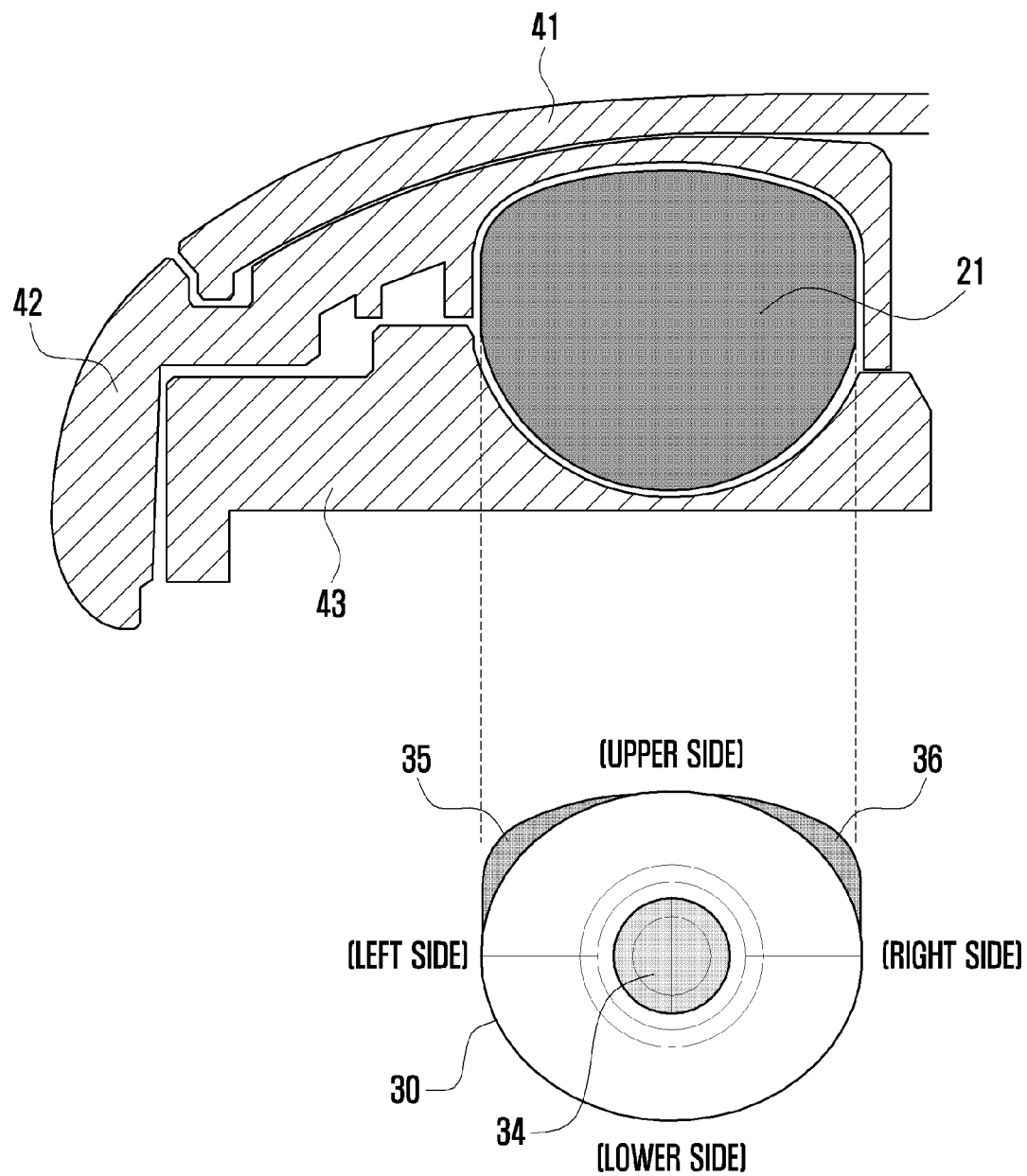
FIG. 5, FIG. 6 and FIG. 7 are exemplary cross-sectional views illustrating the touch pen and the mobile terminal of FIG. 4.
Figure 6:
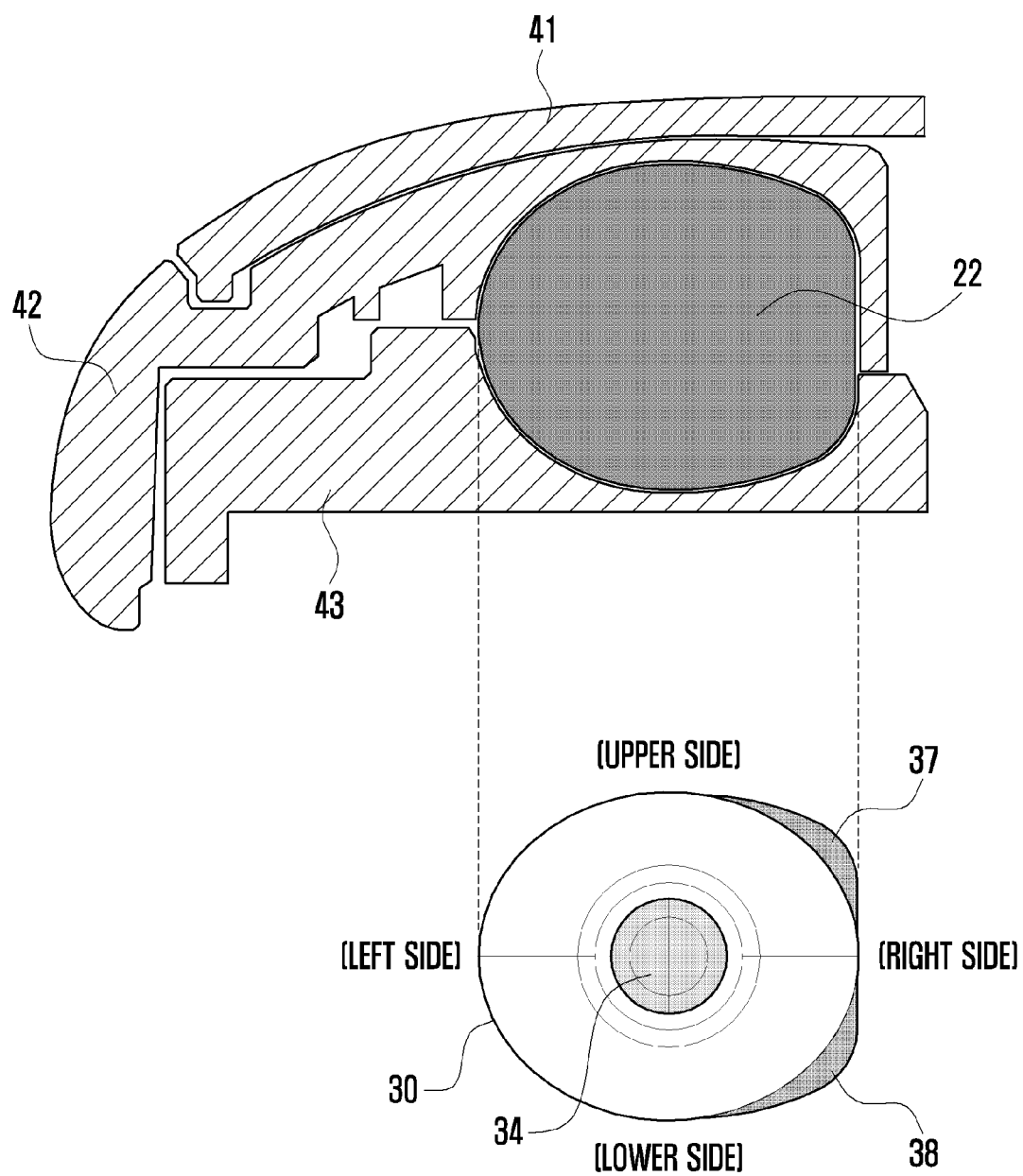
Figure 7:
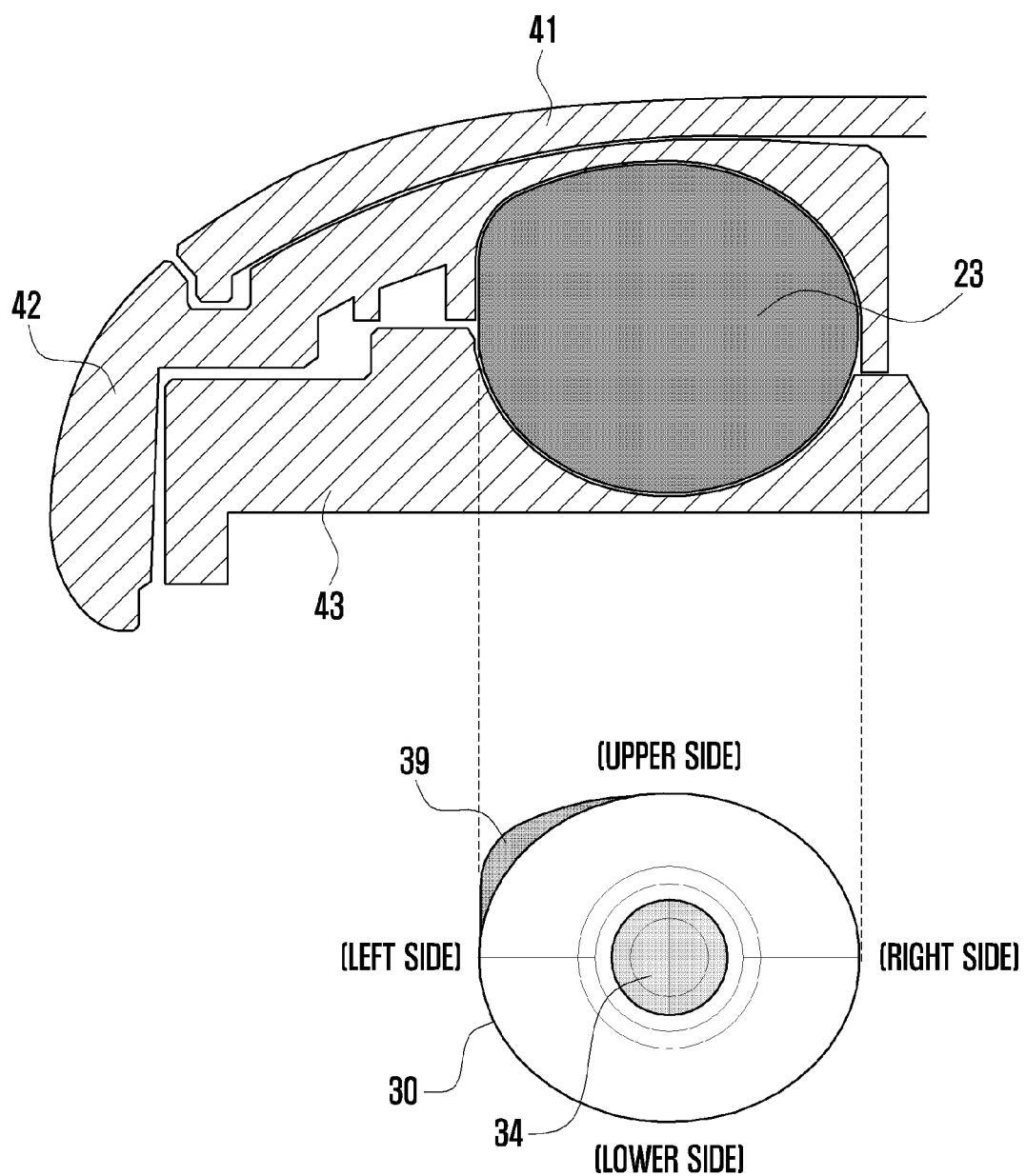

FIG. 3 is a perspective view illustrating a structure of a touch pen according to a set of exemplary embodiments of the present invention. FIG. 4 is a perspective view illustrating an exemplary configuration for a touch pen and a mobile terminal according to a set of exemplary embodiments of the present invention. FIGS. 5 to 7 are exemplary cross-sectional views illustrating the touch pen and the mobile terminal of FIG. 4.

Referring to FIG. 3, a touch pen 30 for use with a mobile terminal 50 (FIG. 4) according to the present set of exemplary embodiments includes a pen point 310 (FIG. 3), a pen grip 330, end portion 340, and eraser portion 350.

Referring to FIG. 4, a mobile terminal 50 is provided with a touch pen 30. According to the present set of exemplary embodiments, the touch pen 30 includes a main body 110 and a pen receiving groove 120.

Hereinafter, the touch pen 30 and the mobile terminal 50 according to a set of exemplary embodiments of the present invention are described in detail with reference to FIGS. 3 and 4.

The pen point 310 (FIG. 3) is a portion of the touch pen 30 (FIGS. 3 and 4) in which the touch pen 30 contacts a touch screen or a touch pad of the mobile terminal 50 (FIG. 4) to thereby apply an input to the touch screen or touch pad. Illustratively, the pen point 310 (FIG. 3) may be formed with an electrically conductive material, or using an injection molding method, or a combination thereof. The pen point 310 may be electrically connected to a circuit or a chip mounted within the touch pen 30 (FIGS. 3 and 4). The pen point 310 (FIG. 3) is formed in one end of the touch pen 30 and has a pointed or tapered end portion for contacting a touch screen.

In order to provide electrical insulation between the pen point 310 (FIG. 3) and other elements of the mobile terminal 50 (FIG. 4), it is preferable that exposed outer edge surfaces of the touch pen 30 (FIG. 3), except for the pen point 310 that is configured for contact the touch screen, are coated with an insulator. The insulator may be formed by processing, forming, molding, or shaping a material such as synthetic resin, rubber, silicon, or wood.

The pen grip 330 is extended in a substantially longitudinal direction with reference to the pen point 310. At least a portion of the pen grip 330 has an asymmetrical cross-sectional area along the longitudinal direction.

Referring to FIGS. 5 to 7, at least a portion of an outer edge circumference of the touch pen 30 defining a cross-sectional area of the touch pen 130 (FIG. 4) along a longitudinal direction of the pen grip 330 is formed to provide at least one protruding asymmetric surface (35 to 39) in the outer edge circumference of the touch pen 30.

Alternatively, although not shown, a portion of the outer edge circumference of the pen grip 330 may have a recessed surface instead of a protruded surface. That is, as a portion of the outer edge circumference thereof may have a protruded surface or a depressed surface or both, thereby providing the pen grip 330 with an asymmetric cross-sectional area along a longitudinal axis of the pen grip 330.

The pen grip 330 has an asymmetrical cross sectional area, such that a circumferential surface of the pen grip 330 is not symmetrical with respect to a portion of one or more of the right side, the left side, the upper side, or the lower side of the pen grip 330. That is, an asymmetrical surface indicates a deformed surface in which asymmetrical figure of one of a circle, an oval, or a polygon (e.g., triangle, quadrangular, pentagon, hexagon, and octagon) of a symmetric structure is deformed by protruding or depressing a portion of the outer surface of the symmetric structure.

For example, a section of the outer edge circumference of the pen grip 330 (FIG. 3) may have a shape in which a left surface 35 (FIG. 5) and a right surface 36 of an upper side of an existing oval structure are protruding from a perfectly symmetric structure by a predetermined extent.

A section of the outer edge circumference of the pen grip 330 (FIG. 3) may have a shape in which an upper surface 37 (FIG. 6) and a lower surface 38 of the right side of an otherwise symmetrical oval structure are protruding by a predetermined extent.

A section of the outer edge circumference of the pen grip 330 (FIG. 3) may have a shape in which only a left surface 39 (FIG. 7) of an upper side of an otherwise symmetrical oval structure is protruding by a predetermined extent.

Thereby, sections of the outer edge circumference 30 of the pen grip 330 shown in FIGS. 5 to 7 may have a deformed asymmetrical oval structure in which a surface is at least partially protruding from an otherwise symmetric structure, or in which a surface is at least partially recessed from an otherwise symmetric structure, or in which a first surface is partially recessed and a second surface is partially protruding.

According to a set of illustrative embodiments described herein, it may be preferable for the pen grip 330 (FIG. 3) to be formed in an asymmetrical shape by using a protruded surface or a recessed surface that can be readily identified or discerned by the naked eye.

The pen grip 330 may be inserted into or withdrawn from the pen receiving groove 120 (FIG. 4) of the mobile terminal 50 in which an outer wall circumference of the pen grip 330 (FIG. 3) is formed to mate with an inner edge circumference of the pen receiving groove 120 (FIG. 4).

In order to provide electrical insulation between the touch pen 30 (FIG. 4) and other elements of the mobile terminal 50, it is preferable that all portions of the touch pen 30, except for the pen point 310 (FIG. 3) that is configured for contact with the touch screen, are coated with an insulator. This insulator may be formed by processing, forming, molding, or shaping a material such as synthetic resin, rubber, silicon, or wood.

When a user uses the touch pen 30 (FIG. 4), the pen grip 330 (FIG. 3) may be held or gripped by a hand of the user, and the touch pen 30 may be extended from the pen receiving groove 120 (FIG. 4).

Regarding the pen grip 330 (FIG. 3), according to a set of illustrative embodiments disclosed herein, at least a portion of the circumferential surface of the pen grip 330 may be flatly formed in a longitudinal direction along the length of the pen grip. By flatly forming a portion of the surface of the pen grip 330, when the user holds and uses the touch pen 30, the user's fingers come into close contact with the pen grip 330 and thus an ergonomically stable grip is provided for the user.

In order to maintain electrical insulation between the touch pen 30 and elements of the mobile terminal 50 (FIG. 4), it is preferable that all outer edge surfaces of the pen grip 330, except for the pen point 310 that is configured for contact with the touch screen, are coated with an insulator. The insulator may be formed by processing or shaping a material such as synthetic resin, rubber, silicon, or wood.

A portion of the pen grip 330 (FIG. 3) may further include a side button 32 for controlling one or more operations of the touch pen 30. For example, in response to pressing or activating the side button 32, the pen point 310 or the eraser portion 350 of the touch pen 30 may be selected and activated, and thus a writing mode or an eraser mode of the touch pen 30 may be enabled.

The end portion 340 is an end portion of the touch pen 30 disposed at an opposite end of the touch pen with reference to the pen point 310. The end portion 340 may be used, for example, to mount an accessory such as a pen holder. The end portion 340 may have the eraser portion 350 included therein. The pen holder, accessory, and eraser portion 350 may be protruding from a surface of the end portion 340.

The eraser portion 350 may be fabricated of an electrically conductive or metal material to be connected to a circuit or a chip within the touch pen 30, and may be driven, controlled, or selected by pressing or activation of the side button 32. The eraser portion 350 may perform, for example a function of deleting an input of the pen point 310 of the touch pen 30.

An end portion of the eraser portion 350 may include an inclined surface that is inclined at a predetermined angle. For example, an edge of the inclined surface may be sharply formed or shaped so as to facilitate contact of the eraser portion 350 with the touch screen. Referring to FIGS. 4 to 7, a mobile terminal 50 having a touch pen 30 according to a set of exemplary embodiments includes a main body 110, a pen receiving groove 120, and a touch pen 30.

The main body 110 (FIG. 4) may include a bracket 43 (FIGS. 5-7) provided within the mobile terminal 50 (FIG. 4) and a rear cover 42 FIGS. 5-7) fastened to a rear surface of the bracket 43.

The pen receiving groove 120 (FIG. 4) includes an inner wall enclosed with the bracket 43 (FIGS. 5-7 and the rear cover 42. The pen receiving groove 120 (FIG. 4) has a sufficient length so as to house the touch pen 30, and may be formed in an outer surface of the main body 110.

At least one surface of an inner wall circumference of the pen receiving groove 120 includes a protruding portion or a recessed portion or both. That is, as an inner wall circumference of the pen receiving groove 120 has a partially protruding structure or a partially recessed structure, such that at least a portion of the pen receiving groove 120 has an asymmetrical cross-sectional area.

Here, as the pen receiving groove 120 has an asymmetrical cross sectional area, a circumferential surface of an inner wall of the pen receiving groove 120 is asymmetrically formed in any one or more portions of the right side, left side, upper side, or lower side of the pen receiving groove 120. That is, an asymmetrical section may be provided in the form of a deformed asymmetrical figure or cross-sectional shape in which a portion of a surface of a symmetrical figure comprising one of a circle, oval, or polygon (e.g., triangle, quadrangular, pentagon, hexagon, and octagon) is protruding or recessed.

For example, a section 21 of the pen receiving groove 120 shown in FIG. 5 may have a shape in which a left surface and a right surface of an upper side of the rear cover 42 are protruding from a perfectly oval cross-sectional shape by a predetermined extent.

A section 22 of the pen receiving groove 120 shown in FIG. 6 may have a shape in which one surface of the rear cover 42 and one surface of the bracket 43 are protruding from a circumference of a perfectly oval cross sectional shape by a predetermined extent.

A section 23 of the pen receiving groove 120 shown in FIG. 7 may have a shape in which one surface of the rear cover 42 is protruding by a predetermined extent from a circumference of a perfectly oval cross sectional shape. For example, sections 21 to 23 of the pen receiving groove 120 shown in FIGS. 5 to 7 may have a deformed asymmetrical oval structure in which a portion of a surface of the pen receiving groove 120 is protruding or projecting from a circumference of a perfectly oval cross sectional shape.

In many situations, it may be preferable that the pen receiving groove 120 is formed in an asymmetrical configuration by using one or more projections or recesses that can be identified by the naked eye.

Particularly, the pen receiving groove 120 according to a set of exemplary embodiments has an asymmetrical cross sectional shape that mates with a corresponding asymmetrical cross sectional shape of the touch pen 30. The asymmetrical cross sectional shape of the touch pen 30 may, but need not, be provided in an erroneous insertion prevention portion 320 (FIG. 3) of the touch pen 30.

Accordingly, by identifying an asymmetrical shape of the touch pen 30 and a corresponding asymmetrical shape of the pen receiving groove 20 by using the naked eye, the user may insert the touch pen 30 into the pen receiving groove 120 in a correct orientation.

Therefore, in a touch pen and a mobile terminal having the same according to a set of illustrative embodiments of the present invention, by forming an outer edge circumference of the touch pen in an asymmetrical shape and by forming a pen receiving groove into a corresponding asymmetrical shape for mating with the asymmetrical shape of the touch pen, upon insertion of the touch pen into the pen receiving groove, a user is provided with tactile and visual feedback for determining a correct orientation for the touch pen being inserted into the receiving groove.

Therefore, the touch pen and the pen receiving groove according to a set of exemplary embodiments of the present invention improves user convenience and prevents damage to the touch pen and the pen receiving groove due to erroneous insertion, scratching, and mechanical deformation.

Further, when a user uses a touch pen according to a set of exemplary embodiments of the present invention, the touch pen provides tactile feedback to the user in the form of a flat surface formed on the touch pen that closely contacts the user's fingers, thereby providing an ergonomically enhanced touch pen.

As described previously, in a touch pen and a mobile terminal having the same according to a set of exemplary embodiments of the present invention, by forming an outer edge circumference of the touch pen in an asymmetrical shape and by forming a pen receiving groove in an asymmetrical shape corresponding thereto for mating with the outer edge circumference of the touch pen, in response to a user inserting the touch pen into the pen receiving groove, the user is provided with visual feedback or tactile feedback, or both, for determining a correct orientation for insertion of the touch pen into the pen receiving groove.

Therefore, in a touch pen and a pen receiving groove according to a set of illustrative embodiments of the present invention, physical damage due to erroneous insertion, scratching, and mechanical deformation may be prevented, and user convenience may be improved.

Further, when a user uses a touch pen according to a set of exemplary embodiments of the present invention, the touch pen provides tactile feedback to the user in the form of a flat surface formed on the touch pen that closely contacts the user's fingers, thereby providing an ergonomically enhanced touch pen.

Although exemplary embodiments of the present invention have been described in detail herein, it should be clearly understood that many variations and modifications of the basic inventive concepts herein described, which may appear to those skilled in the art, will still fall within the scope of the exemplary embodiments of the present invention as defined in the appended claims.

What is claimed is:

1. A mobile terminal having a touch pen, comprising:
   a main body;
   a pen receiving groove formed in an outer surface of the main body, the pen receiving groove having a cross-sectional area defined by an inner wall circumference that has one-fold axis of rotational symmetry; and
   a touch pen having a cross-sectional area defined by an outer edge circumference at least a portion of which has one-fold axis of rotational symmetry, and which is configured for mating with the inner wall circumference of the pen receiving groove at one predetermined relative angular position between the pen and the groove.

2. The mobile terminal of claim 1, wherein the main body comprises a bracket provided within the mobile terminal and a rear cover coupled to a rear surface of the bracket.

3. The mobile terminal of claim 2, wherein the pen receiving groove comprises an inner wall at least partially enclosed by the bracket and the rear cover.

4. The mobile terminal of claim 1, wherein the asymmetrically shaped inner wall circumference of the pen receiving groove includes at least one projection or at least one recessed depression.

5. The mobile terminal of claim 1, wherein the asymmetrically shaped inner wall circumference of the pen receiving groove is shaped such that one or more projections or one or more recessed depressions are incorporated into a portion of a symmetrical figure including at least one of a circle, oval, triangle, or polygon.

6. The mobile terminal of claim 1, wherein the inner wall circumference of the pen receiving groove has an asymmetrical structure that is configured for mating with a corresponding asymmetrical structure of the touch pen.

7. An apparatus comprising:
a touch pen having a pen grip of a predetermined length in a longitudinal direction, the pen grip having a one-fold axis of rotational symmetry, at least a portion of the touch pen having a cross-sectional area along the longitudinal direction that is asymmetrically shaped, such that at least a first surface of an outer edge circumference of the pen grip is protruded or depressed from a second surface of the outer edge circumference of the pen grip so as to provide a tactile indication for distinguishing the first surface from the second surface when inserting the pen into a groove of a mobile terminal prior to any secure positioning of the pen within the groove.

8. The apparatus of claim 7, further comprising a mobile terminal for use with the touch pen.

9. The apparatus of claim 8, wherein a pen receiving groove is formed in the mobile terminal so as to permit an insertion of the touch pen into the pen receiving groove and so as to permit a subsequent withdrawal of the touch pen from the pen receiving groove.

10. The apparatus of claim 8, in which an asymmetrical inner circumference of a cross-sectional area of an inner wall of the pen receiving groove is formed to mate with an asymmetrical outer circumference of the pen grip such that the outer circumference of the pen grip contacts the inner circumference of the groove when the touch pen is received in the groove.

* * * * *